United States Patent [11] 3,577,800

[72] Inventor Edwin L. Jones
 Brookfield, Wis.
[21] Appl. No. 803,700
[22] Filed Mar. 3, 1969
[45] Patented May 4, 1971
[73] Assignee Douglas Dynamics Corporation
 Milwaukee, Wis.

[54] ADJUSTABLE ECCENTRIC
 7 Claims, 4 Drawing Figs.
[52] U.S. Cl. .................................................... 74/571
[51] Int. Cl. ...................................................... G05g 1/24
[50] Field of Search ............................................ 74/571, 87,
 61

[56] References Cited
 UNITED STATES PATENTS
2,677,967 5/1954 Galbraith ..................... 74/87

3,008,347 11/1961 Perkins et al. ................. 74/571

Primary Examiner—Frederick L. Matteson
Assistant Examiner—Randall Heald
Attorneys—John W. Michael, Gerrit D. Foster, Bayard H. Michael, Paul R. Puerner, Joseph A. Gemignani, Andrew O. Riteris and Spencer B. Michael ABSTRACT: An eccentric is mounted on a rotatable shaft and includes three axially spaced masses one of which is fixed, another is circumferentially fixed and axially slidable, and a third is adjustable circumferentially. The axially slidable mass holds the third mass in a selected position and is slidable axially to release the third mass for rotation. The fixed and axially slidable masses have equal and common eccentricities relative to the shaft and the combined masses thereof equals that of the third mass.

Patented May 4, 1971 3,577,800
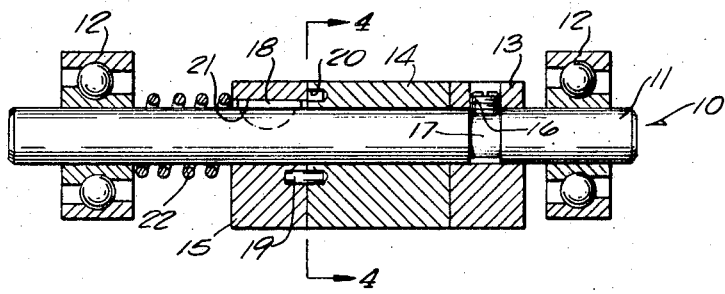
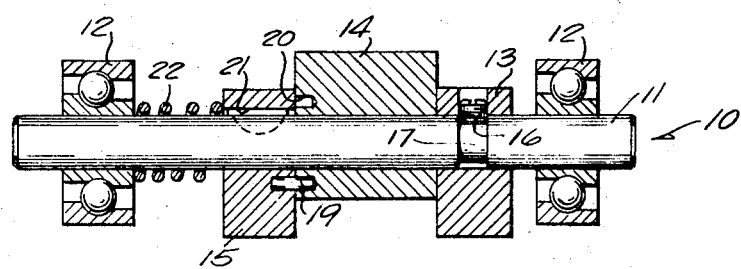
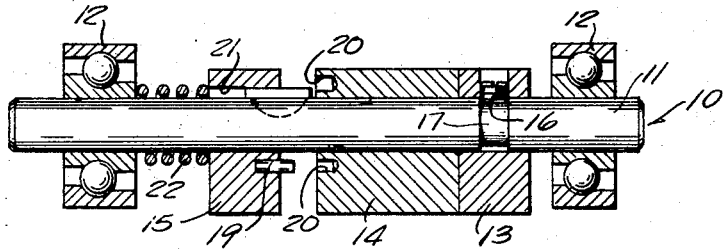
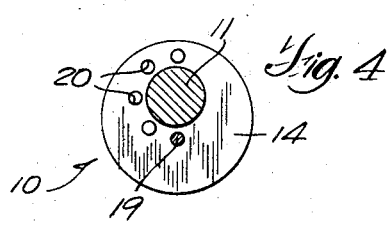
Inventor
Edwin L. Jones
By Joseph A. Geminjuani
Attorney

ADJUSTABLE ECCENTRIC

BACKGROUND OF INVENTION

Power screeds of various sizes are used to level freshly poured concrete surfaces. A common type of power screed employs a "vibrating system" using a rotating eccentric mass to provide the required vibration. The vibrating screed has the effect of increasing the density of the concrete by enhancing natural bleeding to accelerate water and air displacement. It is desirable to provide for adjustment of the eccentric mass to better meet vibration requirements for a given job application. Arrangements which have been proposed to achieve such adjustment have not been entirely satisfactory due to their complex construction and/or not lending themselves to facile adjustment.

SUMMARY OF INVENTION

An object of this invention is to provide an eccentric arrangement of relatively simple construction and one which is readily adjustable.

For achievement of this and other objects, it is proposed to provide axially spaced eccentric masses on a rotatable shaft and connected for joint rotation with the shaft. The net eccentricity of the masses is adjustable and this is accomplished by providing a releasable connection for one of the masses to allow it adjustable rotation with respect to the remainder of the eccentric and shaft. More particularly, an eccentric mass is selectively free to move axially on the shaft to release the rotatable eccentric mass for such adjustment. In this fashion the rotatable eccentric mass can be selectively positioned relative to the remainder of the eccentric to vary the net eccentricity, and hence vibration, between maximum and minimum.

In accordance with a more specific aspect of this invention, three eccentric masses are used. One of the masses is rotatable relative to the other two to achieve adjustment, with one of the other two being movable axially to permit such relative rotation. Also, a pin and series of holes may be used to provide a releasable connection between the eccentrics. A positive engagement is maintained between the pin and holes by a spring which also biases the eccentric masses into engagement. Thus, by simply sliding the pin out of a hole and then adjusting the rotatable mass to the desired position and reengaging the pin in a selected hole, the net eccentricity of the overall eccentric is variable.

DESCRIPTION OF THE DRAWINGS

FIG. 1 is a sectional view of the proposed eccentric system showing a maximum eccentric arrangement;

FIG. 2 is a sectional view showing the eccentric system in a minimum or zero eccentric arrangement; and FIG. 4 is a sectional view taken generally along line 4—4 of FIG. 1.

DESCRIPTION OF THE PREFERRED EMBODIMENT

A screed as known in the construction industry is a device used for conditioning freshly poured concrete. Basically a screed may include one or more screed boards of arbitrary length depending on the job criteria. A vibratory system driven by a suitable power source is connected to the screed board for creating vibration. A screed may be self-propelled or can be designed for manual operation in which case suitable handles are provided.

Referring now to the drawings in detail, FIG. 1 is a sectional view of a proposed vibratory system 10 having a rotatable shaft 11 mounted in bearings 12. The bearings are supported on the screed board or frame in a conventional manner (not shown). The overall construction of the screed is well known in the art, hence, a detailed description is omitted. Shaft 11 is driven by an external power source (not shown) and it will be appreciated that any convenient source such as a gasoline engine, electric motor, or hydraulic motor can be used. The power source can be coupled directly to the system 10 or may be mounted remotely in which case shaft 11 is connected to the source by a belt, chain or gear drive.

Three axially spaced adjacent mass portions 13, 14 and 15 are eccentrically mounted on shaft 11 for rotation with the shaft. Mass 13 is fixed to shaft 11 by any convenient means such that it cannot slide axially or rotate circumferentially with respect to shaft 11, for example, by means of setscrew 16 engaged in annular groove 17 in the shaft. Mass 14 is axially positioned between masses 13 and 15 and is free to rotate circumferentially about shaft 11. Mass 15 is free to slide axially along shaft 11 but is prevented from circumferential rotation relative to the shaft. As illustrated, this is accomplished by providing a key 18 which is seated in the shaft and is engaged in slot 21 in mass 15. A loose fit is provided between mass 15 and key 18 to permit the free axial movement of mass 15.

With this arrangement the net eccentricity of the system can be readily adjusted by varying the circumferential position of eccentric mass 14 relative to masses 13 and 15. More particularly, masses 13 and 15 have a common eccentricity relative to the shaft and when the eccentricity of mass 14 is also common to masses 13 and 15 (FIG. 1), the net eccentricity, and hence vibration, is at a maximum. When mass 14 is adjusted to the position of FIG. 3, i.e. its center of mass or eccentricity is 180° out of phase with that of masses 13 and 15, the net eccentricity and vibration are at a minimum as masses 13 and 15 directly counterbalance mass 14. It will also be apparent that intermediate relative positions can be selected to achieve net eccentricities between the minimum and maximum settings.

A connection is provided to lock the adjustable eccentric mass 14 in a desired circumferential position on the shaft. As illustrated, a pin 19 is anchored in mass 15 and projects axially with respect to shaft 11 towards mass 14 for engagement with it. For receipt of pin 19, mass 14 is provided with a plurality of holes 20 spaced angularly with respect to the shaft axis as shown in FIG. 4. The holes are slightly larger in diameter than pin 19, this results in a loose fit between pin 19 and holes 20 to facilitate engagement of the pin in a selected hole.

The net eccentricity of system 10 can thus be varied by rotating mass 14 to a desired position and then sliding mass 15 such that pin 19 engages an appropriate hole 20. This locks mass 14 from further circumferential rotation. A coil spring 22 may be included to bias mass 15 into engagement with mass 14. Structurally the spring fits over shaft 11 and is seated between bearing 12 and mass 15 to constantly bias mass 15 against mass 14 and provide a positive engagement between pin 19 and a hole 20. With the pin and hole arrangement any desired net eccentricity setting can be selected. It will be appreciated that the number of holes can be increased as finer adjustment is desired.

Preferably mass 14 is equal in weight to the sum of masses 13 and 15, also the masses are identical in radial cross section. With this arrangement the respective centers of mass are on equal radii from the shaft axis or, in other words, as viewed in FIG. 1, on a common axial line. Accordingly, a net eccentricity of zero is achieved in rotating mass 14 180° from the maximum of FIG. 1 to the setting shown in FIG. 3. By providing intermediate holes 20 as shown in FIG. 4, the system 10 can be adjusted for a net eccentricity between the maximum setting of FIG. 1 and a zero setting of FIG. 3. While it is preferred that masses 13, 14 and 15 be of equal diameter and eccentricity and that mass 14 be equal in weight to the sum of masses 13 and 15, it will be appreciated that any combination of weight and adjustment could provide an adjustment range of net eccentricity from maximum to zero. However, the three-mass arrangement as described provides for a balanced vibratory rotation of shaft 11 in bearings 12. The ease with which adjustment may be achieved is illustrated in FIG. 2 wherein mass 15 has been moved axially against spring 22 and pin 19 is disengaged from mass 14 and holes 20 permitting adjustable rotation of mass 14.

The described arrangement is relatively simple in construction and yet affords positive vibration and facile vibration adjustment. Moreover, the eccentric system can be mounted horizontally, vertically, or in an intermediate plane with equal effectiveness.

I claim:

1. An adjustable eccentric for producing vibration comprising, in combination, a rotatably mounted shaft, means defining an adjustable eccentric mounted on said shaft for rotation therewith and including first and second axially spaced eccentric masses, a third mass fixed with respect to said shaft, said third mass and said first mass having a common eccentric alignment with respect to said shaft and said second mass disposed axially between said first and third masses, and means for connecting said first and second masses to each other and to said shaft for joint rotation of said first, second and third masses and said shaft and further operative to release said second mass for adjustable rotational movement on said shaft and relative to said first and third masses, the combined eccentricity of said first and third masses relative to said shaft being equal to that of said second mass such that, when said masses are commonly aligned with respect to said shaft, the net eccentricity and vibration is a maximum and, when said second mass is diametrically oppositely aligned from said first and third masses, the net eccentricity and vibration is zero, whereby the net eccentricity of said eccentric on said shaft axis and the vibration produced as a result of rotation of said eccentric masses is variable between a maximum and minimum by rotating said second mass relative to said first and third masses.

2. The adjustable eccentric according to claim 1 wherein said connecting means fixes said first mass circumferentially with respect to said shaft and connects said first mass for axial movement on said shaft to release said second mass for said adjustable rotational movement.

3. The adjustable eccentric according to claim 2 wherein said connecting means comprises, a pin projecting from one of said masses, means on said other mass defining holes in said other mass and having a generally relative angular spacing with respect to said shaft, said pin arranged to be received selectively in said holes, spring means for biasing said first mass against said second mass and said pin into the selected one of said holes.

4. An adjustable eccentric for producing vibration comprising in combination, a rotatably mounted shaft, a first eccentric mass mounted on said shaft for axial movement thereon, a second eccentric mass mounted on said shaft for rotational movement therewith and further for rotational movement relative thereto, said second mass mounted axially adjacent said first mass, a third eccentric mass fixedly mounted on said shaft axially adjacent said second mass, means for connecting said first and second masses to each other and to said shaft for joint rotation of said first and second masses and said shaft and further operative to release said second mass for adjustable rotational movement on said shaft and relative to said first mass when said first mass is moved axially away from said second mass, said first and third masses having a common eccentric alignment with respect to said shaft and the combined eccentricity of said first and third masses relative to said shaft being equal to that of said second mass such that, when said first, second, and third masses are commonly aligned with respect to said shaft, the net eccentricity and vibration are maximum and, when said second mass is diametrically oppositely aligned from said first and third masses, the net eccentricity and vibration are zero.

whereby the net eccentricity of said eccentric masses on said shaft and the vibration produced as a result of rotation of said eccentric masses is determined by the combined eccentricity of said first, second, and third masses and can be varied by rotating said second mass relative to said first and third masses.

5. The adjustable eccentric according to claim 4 wherein said connecting means comprises, a pin projecting from said first mass, means on said second mass defining holes in said second mass and having a generally relative angular spacing with respect to said shaft, said pin arranged to be received selectively in said holes.

6. An adjustable eccentric comprising, in combination, a rotatably mounted shaft, first and second axially spaced eccentric masses mounted on said shaft, a third mass mounted on and fixed with respect to said shaft, said third mass and said first mass having a common eccentric alignment with respect to said shaft and said second mass disposed axially between said first and third masses, means for connecting said first and second masses to each other and to said shaft for joint rotation of said first and second masses and said shaft and further operative to release said second mass for adjustable rotational movement on said shaft and relative to said first mass, said connecting means fixing said first mass circumferentially with respect to said shaft and connecting said first mass for axial movement on said shaft to release said second mass for said adjustable rotational movement and comprising a pin projecting from one of said first and second masses, means on the other of first and second masses defining holes in said other mass and having a generally relative angular spacing with respect to said shaft, and said pin arranged to be received selectively in said holes, spring means for biasing said first mass against said second mass and said pin into the selected one of said holes, and the combined eccentricity of said first and third masses relative to said shaft being equal to that of said second mass such that the net eccentricity of said eccentric masses on said shaft axis is variable between a maximum eccentricity and minimum eccentricity by rotating said second mass relative to said first mass and, when said masses are commonly aligned with respect to said shaft, the net eccentricity is a maximum and, when said second mass is diametrically oppositely aligned from said first and third masses, the net eccentricity is zero.

7. An adjustable eccentric comprising, in combination, a rotatably mounted shaft, a first eccentric mass mounted on said shaft for axial movement thereon, a second eccentric mass mounted on said shaft for rotational movement therewith and further for rotational movement relative thereto, said second mass mounted axially adjacent said first mass, a third eccentric mass fixedly mounted on said shaft axially adjacent said second mass, means for connecting said first and second masses to each other and to said shaft for joint rotation of said first and second masses and said shaft and further operative to release said second mass for adjustable rotational movement on said shaft and relative to said first mass when said first mass is moved axially away from said second mass, said connecting means comprising a pin projecting from said first mass, means on said second mass defining holes in said second mass and having a generally relative angular spacing with respect to said shaft, and said pin arranged to be received selectively in said holes, spring means biasing said first mass into releasable engagement with said second mass, and said first and third masses having a common eccentric alignment with respect to said shaft and the combined eccentricity of said first and third masses relative to said shaft being equal to that of said second mass such that the net eccentricity of said eccentric masses on said shaft is the combined eccentricity of said first, second and third masses and can be varied by rotating said second mass relative to said first and third masses and when said first, second, and third masses are commonly aligned with respect to said shaft, the net eccentricity is a maximum and, when said second mass is diametrically oppositely aligned from said first and third masses, the net eccentricity is zero.